United States Patent
Juravin et al.

(10) Patent No.: US 12,400,087 B2
(45) Date of Patent: Aug. 26, 2025

(54) METHOD AND SYSTEM FOR DERIVING DIVINE MESSAGING TO HUMANITY

(71) Applicants: Don Juravin, Montverde, FL (US); Levia Juravin, Montverde, FL (US)

(72) Inventors: Don Juravin, Montverde, FL (US); Levia Juravin, Montverde, FL (US)

(73) Assignee: Original Bible Foundation, Montverde, FL (US)

( * ) Notice: Subject to any disclaimer, the term of this patent is extended or adjusted under 35 U.S.C. 154(b) by 326 days.

(21) Appl. No.: 18/092,269

(22) Filed: Dec. 31, 2022

(65) Prior Publication Data
US 2023/0334266 A1  Oct. 19, 2023

Related U.S. Application Data

(60) Provisional application No. 63/295,845, filed on Jan. 1, 2022.

(51) Int. Cl.
*G06F 40/53* (2020.01)
*G06F 40/00* (2020.01)

(52) U.S. Cl.
CPC .............. *G06F 40/53* (2020.01); *G06F 40/00* (2020.01)

(58) Field of Classification Search
CPC ................................ G06F 40/00; G06F 16/285
See application file for complete search history.

(56) References Cited

U.S. PATENT DOCUMENTS

2017/0308613 A1* 10/2017 Zhu ..................... G06F 16/9535
2020/0050667 A1*  2/2020 Lin ......................... G06F 16/35
2022/0083837 A1*  3/2022 Hashimoto ............ G06N 3/047

FOREIGN PATENT DOCUMENTS

CN  103049434 A  *  4/2013
CN  113792818 B  *  3/2023  ........... G06F 40/284

OTHER PUBLICATIONS

Sengupta, "Investigating Antigram Behaviour using Distributional Semantics," arXiv:1901. 05066v1, Submitted on Jan. 15, 2019 (Year: 2019).*
Sengupta, "Investigating Antigram Behaviour using Distributional Semantics," arXiv:1901. 05066v1, Submitted on Jan. 15, 2019—see attached reference in the Non-Final Office action. (Year: 2019).*
Sengupta, "Investigating Antigram Behaviour using Distributional Semantics," arXiv:1901. 05066v1, Submitted on Jan. 15, 2019— (see attached reference in the previous Office action). (Year: 2019).*

* cited by examiner

*Primary Examiner* — Feng-Tzer Tzeng
(74) *Attorney, Agent, or Firm* — Christopher J. Scott

(57) ABSTRACT

A code2GOD system/method helps a user derive secondary meaning from the original Hebrew bible letter string. The system/method includes a primary sequence of letters, each letter of which is associated with a select numerical letter value. The letters within the primary sequence of letters are arranged to form the original Hebrew bible letter string. Words are also identified within the scripture each of which correspond to a select word value and have a primary meaning. The select word value is correlated with at least one other secondary word value, which secondary word value is equated to the select word value. The primary meaning of the at least one first word is interpreted in view of the at least one secondary word value, and the at least one secondary word value is associated with at least one secondary meaning for bolstering an understanding of the primary meaning.

18 Claims, 11 Drawing Sheets

| Letters | Letter Value | Letter Name | Extended Value |
|---|---|---|---|
| א | 1 | Alef אלף | 111 |
| ב | 2 | Bet בית | 412 |
| ג | 3 | Gimel גימל | 83 |
| ד | 4 | Daled דלת | 434 |
| ה | 5 | Hai הא | 6 |
| ו | 6 | Vav וו | 12 |
| ז | 7 | Zain זין | 67 |
| ח | 8 | Cheit חית | 418 |
| ט | 9 | Tet טת | 419 |
| י | 10 | Yod יוד | 20 |
| כ/ך | 20 | Chaf כף | 100 |
| ל | 30 | Lamed למד | 74 |
| מ/ם | 40 | Mem מם | 80 |
| נ/ן | 50 | Nun נן | 106 |
| ס | 60 | Samech סמך | 120 |
| ע | 70 | Aain עין | 130 |
| פ/ף | 80 | Pei פא | 81 |
| צ/ץ | 90 | Tzadi צדי | 104 |
| ק | 100 | Kuf קוף | 186 |
| ר | 200 | Raish ריש | 510 |
| ש | 300 | Shin שין | 360 |
| ת | 400 | Tav תו | 406 |

Column labels: 10 = Letters, 11 = Letter Value, 12 = Letter Name, 13 = Extended Value

PRIOR ART

FIG. 1

WAR 123 מלחמה

מלחמה bread 78 לחם

123-78 = adam 45 אדם tzara צרה   5 200 90 big trouble

295 tzohar צהר   200 5 90 skylight, window to an opportunity 74 75
3.14 = 22/7 = בראשית ברא אלהים את השמים ואת הארץ
        11⁵ 11⁶ 11⁵ 11¹ 11¹ 11² 11²

FIG. 9A sentence value
Genesis 1:1                    75
                          Torah  20
78  2701 = first 611 digits of Pi

[digits of pi] ← 77

FIG. 9B

METHOD AND SYSTEM FOR DERIVING DIVINE MESSAGING TO HUMANITY

PRIOR HISTORY

This application claims the benefit of U.S. Provisional Patent Application No. 63/295,845 filed in the United States Patent and Trademark Office on 1 Jan. 2022, the specifications and drawings of which are hereby incorporated by reference.

BACKGROUND OF THE INVENTION

Field of the Invention

The present invention generally relates to a system and method for enabling a user who can read the ancient Bible in Hebrew, and who has a deep understanding of the current Hebrew language, to derive secondary meaning from the Bible that can be attributed to God's messaging to humanity.

Brief Description of the Prior Art

Gematria is the practice of assigning a numerical value to a name, word or phrase according to an alphanumerical cipher. A single word can yield several values depending on the cipher used. Hebrew alphanumeric ciphers have been reportedly in use for centuries, and were later adopted by other cultures. Gematria sums can involve single words, or a string of lengthy calculations. A well-known short example of Hebrew numerology that uses a gematria cipher is the Hebrew word, "חי" or "chai" or in English, "alive", which is composed of two Hebrew letters, " ח=8" and "'=10" that sum to 18. This particular numerical value in the Jewish tradition has been understood to convey the concept of "being alive".

The following specifications show that the original Bible is written in the Hebrew language and is first presented as a single string or thread of 1,197,000 of the twenty-two Hebrew letters for supporting these specifications. The original Bible is in Hebrew and has never changed with 1,197,000 Hebrew letters and that all other "bibles" are a translation of the original. This is important for purposes of these specifications because the decoding system or code2GOD system and method according to the present invention only works with the original Hebrew bible letter string. While the original Bible in Hebrew opens as follows:

הארץוהארץהיתהתהו ובהוחשךעלפניתהומו רוחאלהימםמרחפתעלפ

יהיאורויהיאור... " "בראשיתבראאלה םאתהשמימםואת

ניהמיםויאמראלהים it can be better understood by the following example in English:

"IngenesisGodbroughtintoexistencetheskiesandthelandandtheearthwaswithoutformandvoi danddarknesswasuponthefaceofthedeepandtheSpiritofGodmovedupon-thefaceofthewaters . . . "

The original Hebrew Bible has been divided into books, chapters, and verses with punctuation and spacing added for enhancing comprehensibility of the Bible. More particularly, the original Hebrew Bible was initially divided into 24 books. Later, the original Hebrew Bible was further divided 39 books and 929 chapters, and both versions were normally read by both those of Christianity and Judaism traditions. Nevertheless, the original Hebrew Bible has remained intact and can be referenced by those wishing to develop a fuller understanding of the Bible as originally presented in the Hebrew language.

The original Hebrew Bible, when presented in a single continuous letter string according to these specifications comprises or provides primary messaging to decoders, but also comprises certain secondary messaging to decoders based on a number of mathematical methodologies according to the present invention that build upon the general principles of the gematria tradition. These methodologies are hereinafter referred to as code2GOD methods or brevity and ease of understanding. The omission or replacement of a single Hebrew letter of the original Hebrew bible letter string alters secondary or code2GOD meaning derivable from the original Hebrew bible letter string. The code2GOD system and method according to the present invention is provided for those who can read Hebrew and who have an understanding of original Hebrew scripture and an ability to decode the Bible utilizing the code2GOD methodologies more particularly described hereinafter.

The original Hebrew Bible may be preferably provided in a single continuous string of 1,197,000 Hebrew letters devoid of spaces and punctuation as derived from the original Hebrew Bible hereinafter referred to as the original Hebrew bible letter string. The original Hebrew scripture was written under strict rules on Kosher leather parchments to create the original Bible scrolls, which were preserved for thousands of years, and did separate original scripture into separate words and paragraphs to enhance comprehensibility thereof. The author of the present specifications was the first ever to present this original Hebrew bible letter string comprising exactly 1,197,000 Hebrew letters devoid of spaces and punctuation as the one Word of God or as authorship of an intelligent designer of life.

There are many who have developed a familiarity with the populous bible of King James. The King James bible was developed at a point in time with translated material with intentional misinterpretations and supported by creative writing that operated to introduce foreign concepts to the original Hebrew Bible with a view toward adding flair and dramatization to pique readers' interest in the Bible. For example, the concepts of "heaven," "hell," and "unicorns," neither appear in the original Hebrew Bible nor exist in their applied meaning and can often lead to a misunderstanding of originally written Hebrew Bible. The original Hebrew bible letter string can be read in a number of ways that include (1) simple stories, (2) parables used to illustrate a moral or spiritual lesson, and (3) coded messaging to decoders all of which can be variously interpreted for (a) enhancing human success and (b) developing a deeper understanding of the meaning of life.

The original Hebrew Bible can, of course, be translated into any language in the world. Original primary meaning as set forth in the original Hebrew bible letter string loses some of the original or primary meaning when so translated. The parables can only be translated into other languages in a limited, narrowed manner, and may not be properly understood as the original Author or intelligent designer intended them to be. For example, the names Cain and Abel are two terms representing the inner human struggle of balance between pursuing materialistic and spiritual lives. The English name, "Cain" is an equivalent of the Hebrew name, "Kain (קין)" and is a derivative of property and has a word value of 160, like the Hebrew term for money, "kesef (כסף)".

The English name, Abel is an equivalent of the Hebrew name, "Hevel (הבל)" and represents the human spirit as the name means the steam, or spirit, that comes out of the human breath and has a word value of 37, which is equivalent to the human body temperature in degrees Celsius. The word value of 37 can then be used to equate this Hebrew term to peripheral factors in the human existence and thereby a decoder can derive secondary meaning or code2GOD meaning from original scripture. It is further noted the Hebrew name or term, "Hevel (הבל)" comprises the first letter in the original Hebrew bible letter string, "ב" and the last letter in the original Hebrew bible letter string, "ה" and can also stand for the entire original Hebrew bible letter string. Relative positions of value-based Hebrew letters within the original Hebrew bible letter string can be used to derive further code2GOD or secondary meaning/messaging from the said scripture.

In the foregoing example of the Cain and Abel biblical story, the story as variously translated, can be understood as illustrating a certain jealousy between the two brothers. The parable as told in the original Hebrew scripture may be explained as follows: Cain is "Kain" or "קין" in Hebrew and has a word value of 160 which numerical value stands for property, which is also the word value for money or "כסף" in Hebrew. Abel is "Hevel" or "הבל" in Hebrew and has a word value of 37 which name stands for the human spirit. The parable can thus be viewed as explanatory of the constant struggle for human balance between a materialistic life and the need for spirituality.

Having considered the pertinent prior art relating to methodologies for deriving secondary meaning from original scripture, the prior art perceives a need for applying coded messaging from the original Hebrew bible letter string. In other words, the prior art appears to be silent on an instructional document that assembles derivable codes inherent to the original Hebrew Bible into one instructional document. No prior art teaching has described a Chosen One or interpreter, which is the critical human factor for understanding complete exhaustive messaging to humanity. Without a Chosen One or interpreter feature, codes inherent to the original Hebrew bible letter string cannot be properly applied to understand the meaning of life and its improvement.

SUMMARY OF THE INVENTION

The system and method according to the present invention, otherwise referred to as "code2GOD" comprises 32 mathematical or algorithmic methods. Their bases are Code Nos. 1 and 2 which are gematria based and derived from the prior art. Sine the codes lead to more advanced scientific and social data than is made available by way of commonly accepted scientific practices, it must be assumed that the creator of the original Hebrew Bible is God or an intelligent designer, and he/she assigned the original numerical values to the series of Hebrew letters that make up the Hebrew alphabet. Furthermore, each of the 22 biblical Hebrew letters is assigned two unique numbers between 1 and 510, and not simply 1 to 22, which is a range of values much more complex and supportive of the code2GOD methodologies that evidences the "language of God". When combining the facts that (1) the code2GOD reveals advanced coded data and (2) the assigned values to the Hebrew letters is statistically complex leads to a conclusion that the originator is a divine entity or intelligent designer.

The present invention essentially provides a system and method, optionally implemented by at least one computer and a non-transitory software-based application implementable by at least one computer for deriving secondary meaning or code2GOD meaning from a select letter string as exemplified by the original Hebrew bible letter string consisting of 1,197,000 Hebrew letters devoid of spaces and punctuation (i.e. the Word of God). When considered methodologically, the method may be said to essentially comprise a series of steps. When considered systemically, the system according to the present invention may be said to essentially comprise at least one computer and a non-transitory computer-implementable application for implementing the essential methodology. For example, a computer and software application implementable by the computer are preferably incorporated into the present invention for rendering Pi or π calculations which is an example of how the code2GOD verifies results.

The system/method according to the present invention enables a user to derive secondary or code2GOD meaning from the exemplary letter string and essentially comprises the step of firstly identifying a primary sequence of Hebrew letters. Each Hebrew letter within the primary sequence of Hebrew letters is associated with a select numerical letter value. The Hebrew letters within the primary sequence of Hebrew letters are arranged to form a select letter string as exemplified by the original Hebrew biblical string consisting of 1,197,000 Hebrew letters devoid of spaces and punctuation. The select letter string has a master string value equal to the sum of the select numerical letter values for each of the letters within the select letter string.

The code2GOD system/method further comprises the step of identifying at least one first word within the select letter string. The word values for each word found within the select letter string sum to the master string value, and respective words within the select letter string each have a substring value less than the master string value. Word values of select words may be correlated or loosely associated with other secondary or peripheral word values by way of the same or similar word values. The primary or face value meaning of firstly considered words can then be interpreted in the context of the secondary or peripheral word values for providing at least one secondary meaning of select words as compared to the primary or face value meaning(s) for bolstering an understanding of the primary meaning(s).

For example, a full anagram of a first select word will always have the same word value of the first select word. In other words, if the letters of the at least one first word are re-arranged to form at least one anagram word, the at least one anagram word comprises the select word value or at least two secondary sub word values if the first select word is re-arranged and broken into a series of anagram words derived from the first select word. The word values for the first select word and its anagram(s) may then be interpreted to further bolster an understanding of the primary meaning of the first select word by way of providing additional numerical information and attendant secondary messaging as derived from the original Hebrew bible letter string.

The code2GOD system/method according to the present invention may further comprise the step of coupling the first select word value to at least one second word value to form a sequence or series of word values, which respectively can provide tertiary meaning or additional secondary meaning as interpreted within the context of multiple word values. The first word value and the at least one second word value may be correlated or otherwise arithmetically operated by way of a select arithmetic operator as selected from the group consisting of addition, subtraction, division and multiplication functions. The select arithmetic operators essentially output an arithmetically-operated word value, which arithmetically-operated word value yields or provides at least one arithmetically-operated word meaning for providing additional secondary or code2GOD meaning.

The relative or absolute position of select letters within the primary sequence of Hebrew letters can be selected to form either a relative position word value or an absolute position word value. Similarly, word values may be characterized by select traits as selected from the group consisting of a mystery word value, a dominant word value, a meaningful word value, and a repetitive word value. The code2GOD system/method according to the present invention may further focus upon a select string of words as selected from a select portion of an opening stanza of the select letter string characterized by the original Hebrew bible letter string.

A first Hebrew letter from each Hebrew word of the select string of Hebrew words are associated with a first Hebrew letter value, and these first Hebrew letter values may be totaled or summed and further operated by dividing the total number of Hebrew letters for yielding a meaningful average numerical value, which meaningful average numerical value is substantially equal to 3.14 or $\pi$. This average numerical value, being substantially equal to the 3.14 or $\pi$, can provide additional secondary or code2GOD meaning for the select string of Hebrew words as selected from a select portion of an opening stanza of the select letter string as exemplified by the original Hebrew biblical string consisting of 1,197,000 Hebrew letters devoid of spaces and punctuation. Select Hebrew word values may also be logarithmically operated to the base of Euler's number e for providing a natural logarithm for select word values for deriving additional secondary or code2GOD meaning.

The code2GOD system/method according to the present invention may further involve the summation of select numerical letter values for each Hebrew letter in a select series of Hebrew letters to provide a single reduced numerical value. The single reduced numerical value can be identified as being either (a) between a range of values, the range of values being from 1 to 9; or (b) a select unique numerical value, the select unique numerical value being selected from the group consisting of 11, 22, 33, and 44. The single reduced numerical value can be used to derive additional secondary or code2GOD meaning for Hebrew words having the same or related reduced numerical values as so reduced.

The code2GOD system/method according to the present invention may further focus upon a series of factors that are utilized to operate upon a select letter sub-string within the select letter string. These series of factors may comprise or consist of acronym-forming letters; select intervals of letters; and directional movement within the select letter string, the series of factors for providing additional secondary or code2GOD meaning. It is contemplated that a computer and a software-based application may well provide the most efficient means for deriving secondary or code2GOD meaning from portions of the original Hebrew Biblical string very much akin to the manner in which genetic traits within human DNA are located and identified.

The code2GOD system/method according to the present invention may further focus upon the use of geometrical data to operate upon the select word value for providing additional secondary or code2GOD meaning. Geometrical data associated with the Star of David, for example, can be utilized to confirm the importance of the numerical values of 37 and 73. In this regard, it will be noted the Star of David Theorem is a mathematical result based on arithmetic properties of binomial coefficients, which binomial coefficients can be used to convey or derive secondary or code2GOD meaning from one or more select letter strings as exemplified by the original Hebrew biblical string or scripture.

The code2GOD system/method according to the present invention may further comprise the step of utilizing a select count factor to operate upon the select word value. The select count factor may be selected from the group consisting of a number of letters or letter number within a chosen letter string; a number of letters or letter number within related word strings; and a number of letters or letter number within a sentence. In this regard, it will be noted the number of singular word repetitions in the original Hebrew Bible string can provide meaningful word values. Further, matching the first and last letters of a Hebrew word with the first and last letters of a verse from the original Hebrew bible string provides information for deriving additional secondary or code2GOD meaning. Further, using prime or Fibonacci numbers to explain correlations between Hebrew words or verses provides information for deriving additional secondary or code2GOD meaning.

The code2GOD system/method according to the present invention may focus upon the fact that each Hebrew letter within the primary sequence of Hebrew letters comprises a unique size and shape. The unique size and shape of each Hebrew letter provides factor data, which factor data may be selected from the group consisting of letter termini data (i.e. number of letter end points); directional termini data (i.e. the number of letter end points in each of the four primary directions); and relative height-width data (the relative size of comparable Hebrew letters). The factor data can provide additional secondary or code2GOD meaning.

BRIEF DESCRIPTION OF DRAWINGS

Other features and objectives of the code2GOD system/method according to the present invention will become more evident from a consideration of the following brief descriptions of patent drawings.

FIG. 1 is a Prior Art table setting forth rows and columns of the Hebrew alphabet setting forth Hebrew letters, letter values for each Hebrew letter, letter nomenclature for each Hebrew letter and extended values for each letter nomenclature.

FIG. 9A is a visual depiction of summing the initial letter values for each of seven Hebrew words and dividing the resulting word value by the number of initial letter values to yield an average value of 3.14 or π.

FIG. 9B is a visual depiction of a sentence value determination as derived from a first verse of the original Hebrew bible string that is equivalent to the first 611 post decimal digits of π.

DETAILED DESCRIPTION OF THE PREFERRED METHODOLOGY

Figure 2:
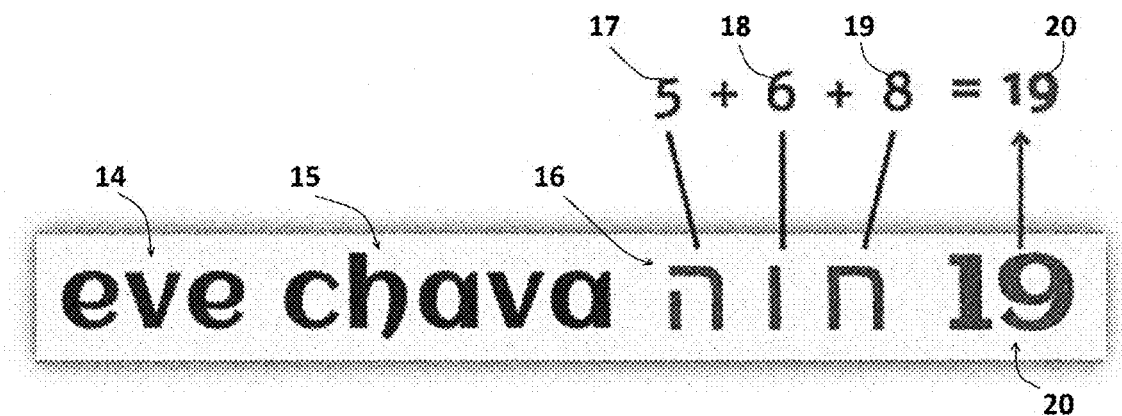
FIG. 2 is an example of how a word value may be associated with a Hebrew word according to the present invention; viewed from left to right is an exemplary English word, its Hebrew equivalent in the English language, its Hebrew equivalent in the Hebrew language, and a word value associated with the Hebrew word as derived from the numerical values associated with Hebrew letters set forth in FIG. 1.

Referring now to the drawings with more specificity, the following specifications generally describe a system and method for deriving secondary or code2GOD meaning from scripture as exemplified by an original Bible-coded letter string comprising a single continuous string of 1,197,000 Hebrew letters devoid of spaces and punctuation. These specifications describe a number of codes or algorithms for deciphering or deriving secondary or code2GOD meaning from Hebrew scripture as exemplified by the original Hebrew bible letter string noting that each Hebrew letter or character of the Hebrew alphabet has an inherent value associated therewith. In this regard, the reader is firstly directed to FIG. 1 detailing or listing (a) the twenty-two Hebrew letters as set forth in Column 10; (b) the numerical letter values associated with each Hebrew letter or character as set forth in Column 11; (c) the letter name or nomenclature for each Hebrew letter written in both English and corresponding Hebrew as set forth in Column 12; and (d) extended word values for the Hebrew letter names as set forth in Column 13.

Referencing FIG. 1, the reader will note that Each of the biblical Hebrew letters set forth in Column 10 comprises or is associated with a numerical letter value (letter=value) as further set forth in corresponding rows in Column 11. While an English letter is only a pronounced symbol, each of the biblical Hebrew letters further corresponds or is associated with a personal name comprising a plurality of Hebrew numerical value-based letters. For ease of understanding both English and Hebrew names of each Hebrew letter are presented or set forth in Column 12. The name or nomenclature of each Hebrew letter has a numerical value called an "extended value" as set forth in Column 13. A first code or algorithm or Code No. 1 upon which the present invention builds is a biblical numerical letter value of each Hebrew letter. These numerical letter values are set forth in Column 11. A second code or algorithm or Code No. 2 upon which the present invention builds is the extended word value of each Hebrew letter name set forth in Column 12. These extended word values are set forth in Column 13.

For example in a first instance, the biblical Hebrew letter "א" has a numerical letter value of 1 and is pronounced like the letter, "A" in the English language. The name or nomenclature for the biblical Hebrew letter, "א" is "Alef" in the English language or, "אלף" in the Hebrew language with an extended word value of 111 as calculated by summing the numerical letter values for each Hebrew letter within the letter name. From left to right for ease of understanding, the Hebrew letter, "ף" is associated with the numerical letter value 80, the Hebrew letter, "ל" is associated with the numerical letter value 30; and the Hebrew letter, "א" is associated with the numerical letter value 1.

These numerical letter values sum to a word value (20) of 111 and this total is the extended word value for the named Hebrew letter, "א". For example in a second instance, the biblical Hebrew letter, "ק" letter value is 100, pronounced like, "K" in the English language. Its English name is, "Kuf" and its Hebrew name is, "קוף" with an extended word value of 186. From left to right for ease of understanding, the Hebrew letter, "ף" is associated with the numerical letter value 80, the Hebrew letter, "ו" is associated with the numerical letter value 6; and the Hebrew letter, "ק" is associated with the numerical letter value 100. These numerical letter values sum to 186 and this total is the extended word value for the named Hebrew letter, "ק"

A third code or algorithm or Code No. 3 upon which the present invention builds is a word value (20) associated with a Hebrew word. In this regard, a Hebrew word comprises a series of Hebrew letters and the numerical letter values of each Hebrew letter within the Hebrew word are added to provide the word value (20). In this regard, the reader is directed to FIG. 2, which figure provides an example of how a word value (20) is calculated for the exemplary English word, "Eve" as at (14) otherwise pronounced as "Chava" as at (15) in Hebrew and written as, "חוה" as at (16) in Hebrew. From left to right for ease of understanding, the Hebrew letter, "ה" is associated with the numerical letter value 5 as at (17); the Hebrew letter, "ו" is associated with the numerical letter value 6 as at (18); and the Hebrew letter, "ח" is associated with the numerical letter value 8 as at (19). These numerical letter values sum to 19 and this total is the extended word value (20) for the Hebrew word, "חוה" (16).

Word values (20) may essentially be used anagrammatically or in equations to yield code2GOD messaging or secondary meaning as derived from the primary meaning of the words within the original Hebrew biblical letter string. Secondary or code2GOD meaning derived from the original Hebrew biblical letter string may relate to how the human environment is structured and how humans are wired for a meaningful life within that human environment. These code2GOD messages or the secondary meaning associated therewith may be regarded as scientific, social, and meant to improve the wellbeing of humanity. This secondary or code2GOD meaning can help bolster one's appreciation and understanding of environmental structure and the role humans play in that environmental structure.

Figure 3A:
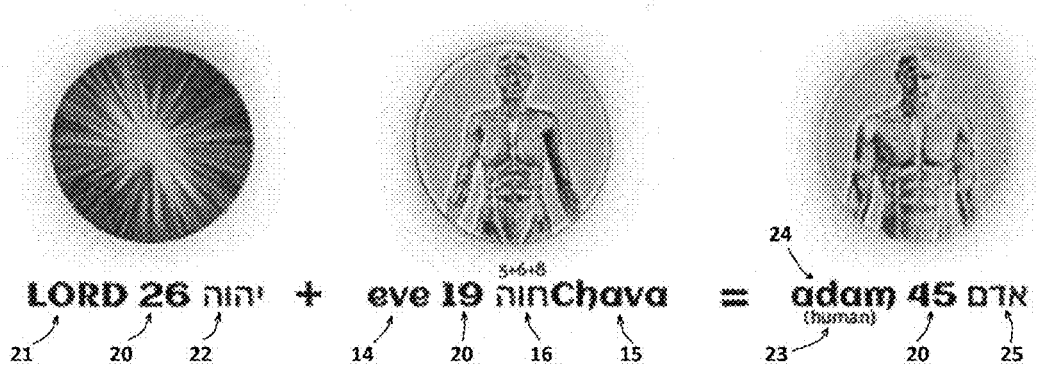
FIG. 3A is a first example of a simple word value equation in which a first word value is arithmetically added to a second word value to yield a first sum or first total word value with an associated Hebrew word.

A fourth code or algorithm or Code No. 4 according to the present invention is the use of Hebrew words as meaningful equations, and is illustrated by the following examples as further supported by FIGS. 3A-6. A first example of the use of Hebrew words as equations or Code No. 4 according to the present invention is generally illustrated in FIG. 3A in the form of a first simple addition operation. Referencing FIG. 3A, the reader will there first consider the English word, "Lord" as at (21) otherwise written as, "יהוה" in Hebrew as at (22). The word value (20) for, "Lord" (21) or, "יהוה" (22) is 26 in Hebrew. The reader will further recall the word value (20) for the English word, "Eve" (14) or "Chava" (15) or "חוה" (16) in Hebrew is 19. Summing the word values (20) of 26 for, "Lord" (21) or "יהוה" (22) and 19 for "Eve" (14) or "Chava" (15) or, "חוה" (16) equals or provides a word value (20) of 45. The word value (20) of 45 equates with the word value (20) of the Hebrew word, "אדם" as at (25) otherwise written in English as "human" as at (23) or "Adam" as at (24).

Figure 3B:
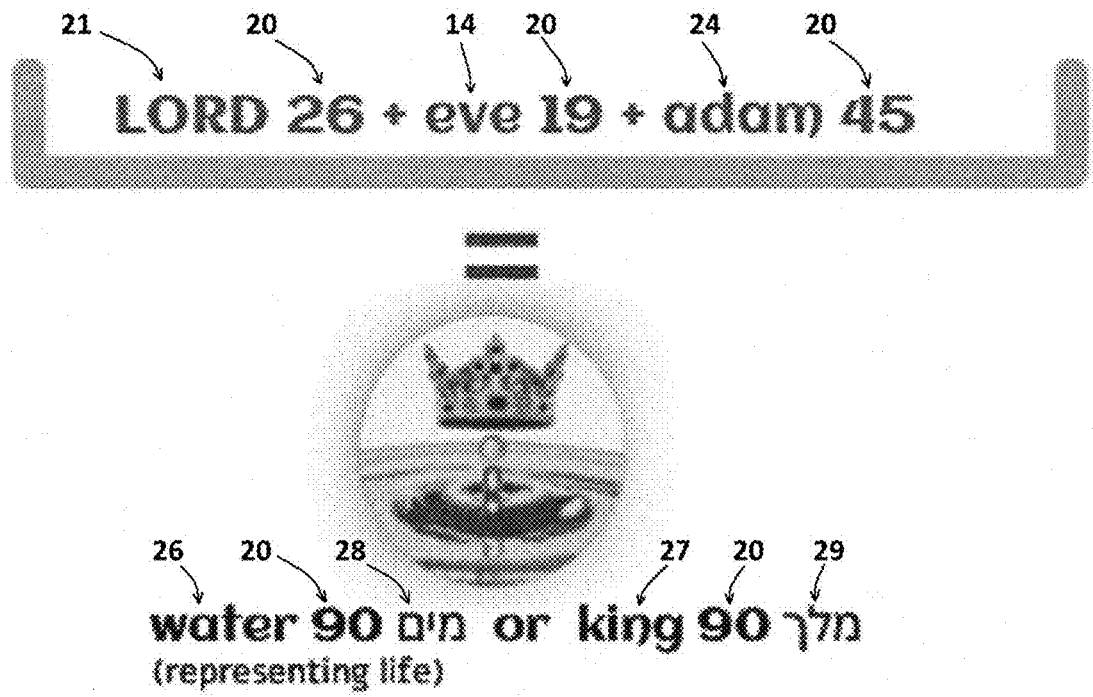
FIG. 3B is a second example of a simple word value equation in which the first word value is arithmetically added to the second word value and added to the first total word value otherwise depicted in FIG. 3A to yield a second sum or second total word value or combination word value with alternatively associated Hebrew words.

Referencing FIG. 3B, the reader will there consider a second example of the use of Hebrew words as equations or Code No. 4 according to the present invention in the form of a second simple addition operation. Recalling the word value (20) for the Hebrew word or term, "יהוה" (22) (or in English, "Lord" (21)) equals 26 and that the word value (20) for "Chava" (15) or "חוה" (16) in Hebrew (or in English, "Eve" (14)) is 19 the decoder can then add the Hebrew word, "אדם" (25) with a word value (20) of 19. The total resulting word value (20) is 90, which corresponds to the word value (20) for either, "מים" (28) or "מלך" (29) in Hebrew which translate to "water" (26) (representing life) or "king" (27) in English, respectively.

Figure 3C:
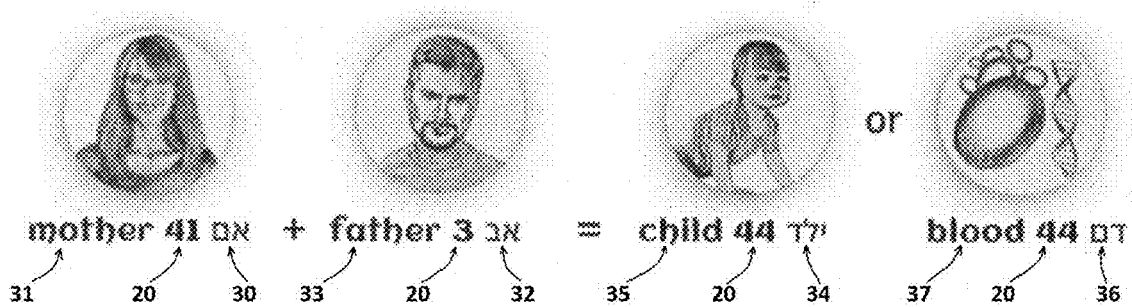
FIG. 3C is a third example of a simple word value equation in which a "mother" word value is arithmetically added to a "father" word value to yield a combination word value of 44, which word value may be alternatively associated with either of the words, "child" or "blood".

Referencing FIG. 3C, the reader will there consider a third example of the use of Hebrew words within simple word-based equations or Code No. 4 according to the present invention in the form of a third simple addition operation. The word value (20) for the Hebrew term, "אם" (22) (or in English, "mother" (31)) equals 41 and the word value (20) for the Hebrew term, "אב" (32) (or in English, " "father" (33))) equals 3. Adding the word values (20) of "אם" or 41 and "אב" or 3 equals a word value (20) of 44, which word value (20) corresponds to either the Hebrew term, "ילד" or in English, "child" (35), or the Hebrew term, "דם" (36) or in English, "blood" (37). When interpreted by a chosen interpreter, the resulting secondary or code2GOD meaning may translate into a message that a "mother" (31) and a "father" (33) together yield a "child" (35) or alternatively, "blood" line (37).

Figure 3D:
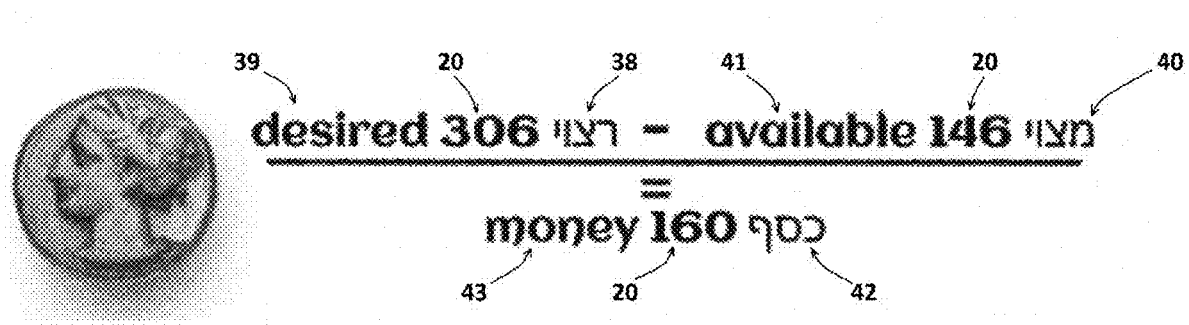
FIG. 3D is a fourth example of a simple word value equation by which the Hebrew word for "available" is subtracted from the Hebrew word for "desired" to yield a difference word value of 160 corresponding to the Hebrew word for "money".

Referencing FIG. 3D, the reader will there consider a fourth example of the use of Hebrew words as equations or Code No. 4 according to the present invention in the form of a simple subtraction operation. The word value (20) for the Hebrew term, "רצוי" (38) (or in English, "desired" (39)) equals 306 and that the word value (20) for the Hebrew term, "מצוי" (40) (or in English, "available" (441)) equals 146. Subtracting the word value (20) of the Hebrew "מצוי" (40) or 146 from the Hebrew "רצוי" (38) or 306 equals a word value (20) of 160, which word value (20) corresponds to the Hebrew term, "כסף" (42) (or in English, "money" (43)). When interpreted by a chosen interpreter, the resulting secondary or code2GOD meaning may translate into a message that "money" (43) can close the gap between the "desired" (39) and the "available" (41). A fifth non-illustrated example of the use of Hebrew words as equations or Code No. 4 according to the present invention in the form of a second simple subtraction operation, as follows: Male=227=zachar= "זכר" minus Female=157=nekeva= "נקבה"=Confusion=70=bilbul= "בלבו".

Figure 4:
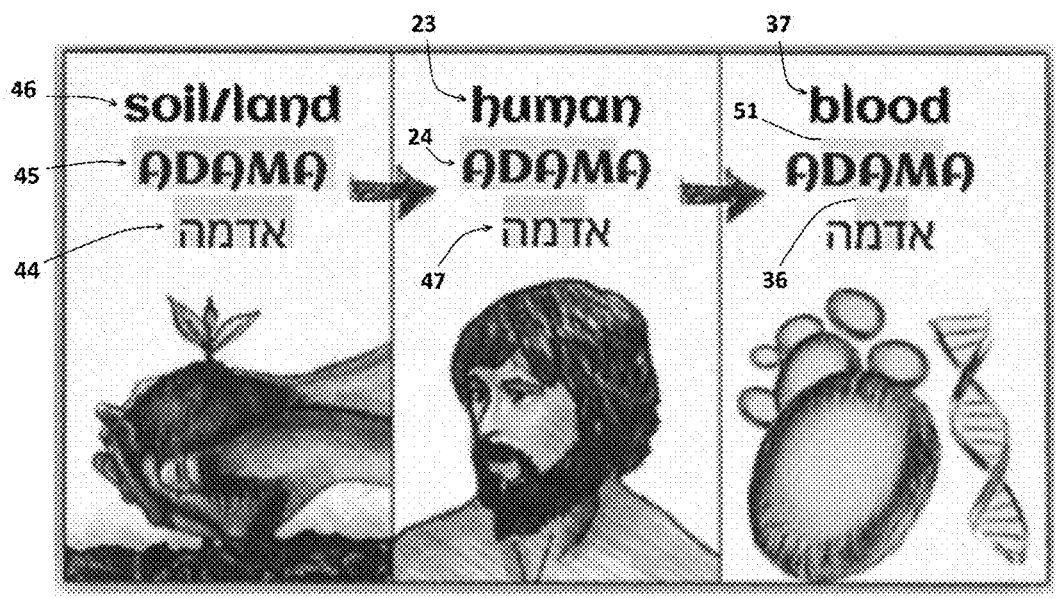
FIG. 4 is a visual depiction of a parent letter string or word that may portioned to yield alternative child letter strings or words from the parent letter string or word.

Referencing FIG. 4, the reader will there consider a first example of a fifth code or algorithm or Code No. 5 according to the present invention. Code No. 5 is essentially the telling of a story in a single Hebrew word. The Hebrew letters that make up the Hebrew word can be reassembled in a different order or broken into sub-words to create a message or a story, while maintaining the same overall word value. For example, the Hebrew word, "אדמה" (44) or in English "Adama" (45) (meaning land/soil (46)) having a word value (20) of 50 comprises the Hebrew word, "דמה" (47) or in English Adam (24) meaning "human" (23) having a word value (20) of 49, which Hebrew word, "דמה" (47) further comprises the Hebrew word, "דמ" (36) or in English "dam" (51) meaning blood (37) with a word value (20) of 44. The resulting secondary or code2GOD meaning may translate into a message that humans have a soul-blood bond with the land or that humans were originated from and shall return to buried in/become soil.

Figure 5:
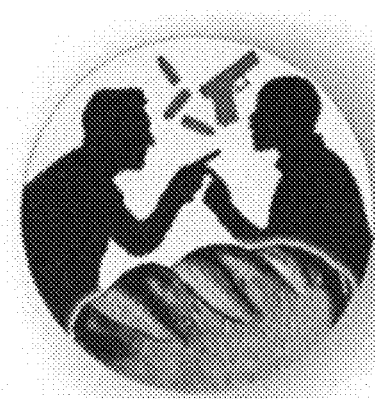
FIG. 5 is a fifth example of a simple word value equation by which the Hebrew word for "bread" is subtracted from the Hebrew word for "war" to yield a difference word value of 45 corresponding to the Hebrew name for "Adam".
Figure 6:
FIG. 6 is an example of a simple word value depicting how the rearrangement of Hebrew letters within a first Hebrew word may yield a Hebrew anagram word having the same word value.
Figure 6:
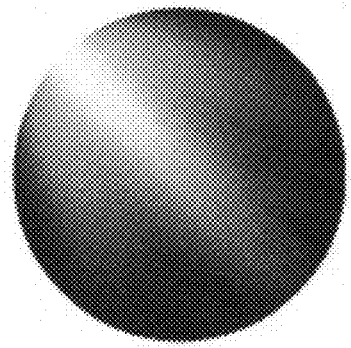

Referencing FIG. 5, the reader will there further consider a second example of Code No. 5 according to the present invention. The Hebrew word, "מלחמה" (53) or in English "war" (54) having a word value (20) of 123 comprises the Hebrew word, "לחמ" (55) or in English "bread" (56) having a word value (20) of 78. The word value (20) of 123 for "war" (54) less the word value (20) of 78 for "bread" (56) yields a word value (20) of 45, which word value (20) 45 corresponds to or equates with the word value (20) of the Hebrew word, "אדם" (25) otherwise written in English as "human" (23) or "Adam" (24). The resulting secondary or code2GOD meaning may translate into a message that humans were created to always fight for their bread or existence.

Third and fourth examples of Code No. 5 not specifically illustrated include the following: the Hebrew word, "כלב" or "kelev" meaning "dog" in English has a word value (20) of 52. By subtracting, "כ" with word value (20) of 20 from, "כלב" with word value (20) of 52, the result is, "לב" with word value (20) of 32 with English translation, "like a heart". Further, the six Hebrew letters that together form the first Hebrew word of the original Bible are, "בראשית" or "bereshit" meaning "Genesis" in English and has a combined word value (20) of 913. These individual Hebrew letters can be rearranged into at least twenty-two separate Hebrew words, each with a related meaning to the concept of creation. The Chosen interpreter may then utilize these twenty-two anagram words to better elaborate upon or otherwise explain secondary or code2GOD meaning relating to the formation of the universe.

A sixth code or algorithm or Code No. 6 according to the present invention relates to Hebrew words having identical word values (20). In other words, different Hebrew words that share the same word value (20) can also be interpreted to share other attributes in common for revealing secondary or code2GOD meaning as exemplified by the concepts of love, money, family, soul, life purpose, etc. For example, a word value (20) of 13 may be equated with the following: love or "אהבה"; one or "אחד"; fairytale or "אגדה"; worry or "דאגה"; and lost or "אבוד". A word value (20) of 160 may be associated with money or "כסף"; tree or "עץ"; codes or "קודים"; and tone or "צליל". A word value of 395 may be equated with higher soul or "נשמה"; and the skies or "השמים". A word value of 90 may be associated with water or "מים" and newborn or "נולד". A word value of 160 may be equated with tree or "etz" or "עץ"=money or "kesef" or "כסף"=codes or "kodim" or "קודים". The resulting secondary or code2GOD meaning may translate into a message that having the right codes (like formula) can help one grow more greens (money) and branches.

A seventh code or algorithm or Code No. 7 according to the present invention involves the provision of parable messaging via anagram. In other words, the rearrangement of Hebrew letters (each having a numerical letter value (11)) within a Hebrew word yields a different secondary or code2GOD meaning while maintaining the same numerical word value (20). Referencing FIG. 6, the reader will there consider the Hebrew word, "צרה" (57) or "tzara" (58) or in English "big trouble" (59). This Hebrew word has a word value (20) of 295. The anagram "צהר" (60) or "tzohar" (61) or in English "skylight or window to an opportunity" (62) comprises the same word value (20) of 295.

The resulting secondary or code2GOD meaning may translate into a message that trouble (with an inherent negative connotation) may provide a window to an opportunity (with an inherent positive connotation). In other words, when encountering "big trouble" (59) or "צרה" (57) or "tzara" (58), look for the "bright opportunity" (62) or "צהר" (60) or "tzohar" (61). Conversely, when encountering "צהר" (60) or "tzohar" (61) or an "opportunity" (62), be careful to avoid "צרה" (57) or "tzara" (58) or "big trouble" (59). Other non-illustrated examples include a word value (20) of 78 which equates with either "לחם" or in English "bread" or "מלח" or in English "salt"; and the word value (20) of "יקום" or "yekum" or in English universe or "קיום" or "ki-iom" or in English "survival".

An eighth code or algorithm or Code No. 8 according to the present invention involves the position of the respective Hebrew letters within the table otherwise presented in FIG. 1. In other words, observing the letters' relative (or absolute) position on the lineup from the first Hebrew letter, "א" to the last Hebrew letter, "ת" can be seen to reveal secondary or code2GOD meaning. In this regard, the reader is directed to FIG. 7. Referencing FIG. 7, the reader will there consider the Hebrew word, "אמת" (63) or "emet" (64) or in English, "truth" (65). The Hebrew word, "אמת" (63) comprises the first Hebrew letter, "א" with a numerical letter value of 1; the last Hebrew letter, "ת" with a numerical letter value of 400; and a middle Hebrew letter, "מ" with a numerical letter value (11) of 40 combining to provide a total word value (20) of 441. The resulting secondary or code2GOD meaning may translate into a message that "truth" (65) is not definite and can be found within the entire spectrum of possibilities as at (66).

Figures 7A, 7B:
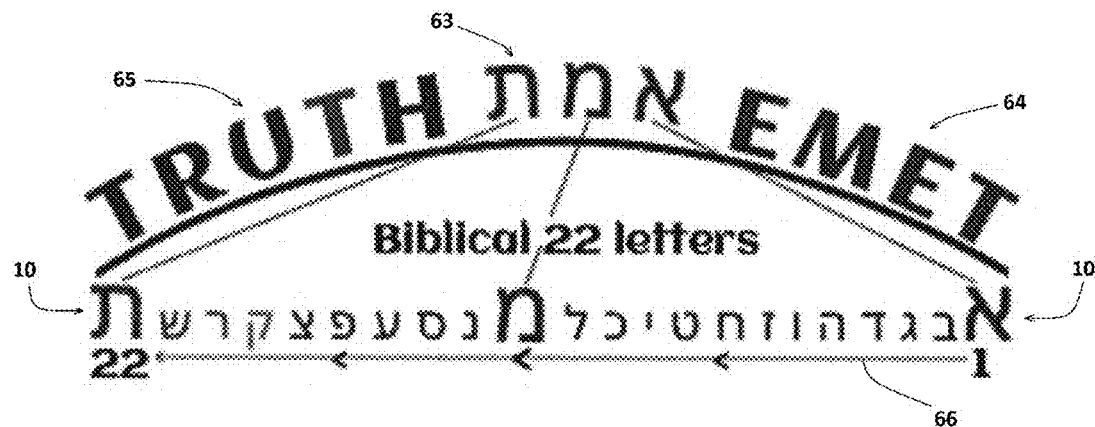
FIG. 7A is a visual depiction of the Hebrew alphabet highlighting the position of Hebrew letters within the Hebrew alphabet to yield a Hebrew word along with its English equivalent and its Hebrew equivalent in the English language.
FIG. 7B is a sixth example of a simple word value equation by which the Hebrew word for "truth" is subtracted from the Hebrew word for "lie" to yield a difference word value of 159 corresponding to the Hebrew word for "small".

Comparatively referencing FIGS. 7A and 7B, the reader will further consider the Hebrew word, "שקר" (67) or "sheker" or in English, "lie" (68). The Hebrew word, "שקר" (67) comprises the $19^{th}$, $20^{th}$, and $21^{st}$ Hebrew letters ahead of the last Hebrew letter, "ת". Noting that the last or $22^{nd}$ Hebrew letter, "ת" is found within the Hebrew word, "אמת" (63) for "truth", a secondary or code2GOD meaning that may be derived from the Hebrew word, "שקר" (67) is that humans are wired to know, or identify, what a "lie" (68) is, which is also intentional, according to Code No. 8. However, even a "lie" (68) is set within a slim possibility of being within the spectrum of the truth. Furthermore, humans should not shrink from truth telling and for the decoder/student to be open to receiving the truth on the entire spectrum of life's possibilities. Recalling Code No. 4, (Words As Meaningful Equations) the reader will further see that the difference between a "lie" (68) with a word value (20) of 600 and the "truth" (65) with a word value (20) of 441 can be "small" (70) or in Hebrew, "קטן" which Hebrew term equates to a total word value (20) of 159.

Figure 8A:
FIG. 8A is a visual depiction of a dominant word value within the Hebrew language, namely 37, along with a Hebrew word corresponding to the dominant word value, its English equivalent, and its Hebrew equivalent in the English language.
Figure 8B:
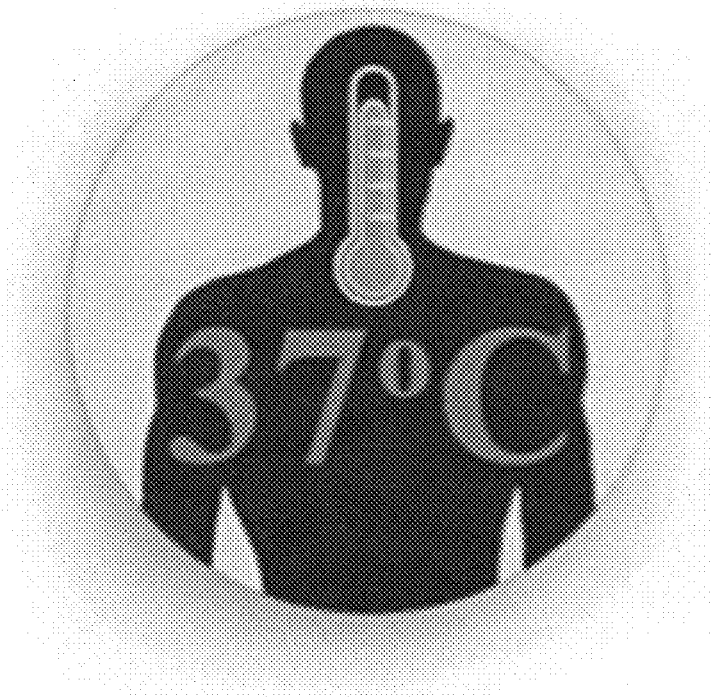
FIG. 8B is a visual depiction of the dominant word value otherwise depicted in FIG. 8A overlaid upon imagery of a human torso corresponding to normalized human body temperature in degrees Celsius.

A ninth code or algorithm or Code No. 9 according to the present invention involves the identification of a mystery, dominant, meaningful, or repetitive number within the numerical word values (20) provided by the Hebrew language. In this regard, the chosen interpreter will cross reference word values (20) with facts of life to provide code2GOD messaging or secondary meaning as derived from these mystery, dominant, meaningful, or repetitive number values inherent to the Hebrew language. FIGS. 8A through 8C are presented in support of Code No. 9. Referencing FIG. 8A, the reader will there consider the first verse of the original Hebrew bible comprises a word value (20) sum of 2701 as derived from the addition of all 28 letters of this first verse.

An example of a mystery, dominant, meaningful, or repetitive number within the numerical word values (20) provided by the Hebrew language is the number 37. The reader will note that the number 2701 as derived by the addition of all 28 Hebrew letters of the first verse of the original Hebrew bible is also the product of the numerical value 37 multiplied by the numerical value 73. The number 2701 is also the sum of 37+999+888+777. The number 37 is also a multiplier of 999 (i.e. 37×27), of 888 (i.e. 37×24) and of 777 (i.e. 37×21). According to the present invention, the chosen interpreter may derive the importance of the number 37 and relate to this to the human condition as derived from within the Hebrew language. The number 37, for example, is the human body temperature (and also the body temperature of certain mammals: whale (sea), bat (air) and lion (ground)) in Celsius degrees as generally depicted in FIG. 8B, and may thus be translated as evidencing the "human spirit" (73) as comparatively referenced in FIG. 8A. Referencing FIG. 8A, the reader will there consider the word value (20) of the Hebrew word, "הבל" (71) or "Hevel" (72) comprising the first Hebrew letter, "ב" and the last Hebrew letter, "ל" of the Torah and the original Bible and in English is "Habel" (Hevel or הבל) representing the "human spirit" (73).

A tenth code or algorithm or Code No. 10 according to the present invention involves the use of pi or in Greek, "π". It is noted that the numerical value of pi (the ratio of a circle's circumference to its diameter) is commonly understood to comprise an infinite number of digits after the primary integer value of 3 as in 3.14159 . . . . The concept of pi or "π" is encoded in the first verse of the original Bible in the Hebrew language. In this regard, it is noted that the value of 3.14 (74) is the average letter value of each of the first letters of each of the seven words of the first verse of the original Bible in Hebrew. In this regard, the reader is directed to FIG. 9A. Referencing FIG. 9A, the reader will there consider the first seven Hebrew words of the first verse with numerical letter values (11) presented for each of the first seven Hebrew words. Summing these numerical letter values provides a sum of 22 as at (75), which when divided by the number of Hebrew words or 7 yields 3.14 (74). This so-called pi decoder or π decoder feature aids in deriving secondary or code2GOD meaning or verifying previous findings. Code No. 9 according to the present invention utilizes four pi/π parameters, namely, (1) the sum of a set string of numbers; (2) the number of digits in a set string; (3) the starting digit number in the pi/π infinite string; and (4) adjacent coded set of numbers.

For example, referencing FIG. 9B, the reader will there consider a representation of the first 5 books of the Bible commonly referred to as the Torah as at (76) or in Hebrew, "תורה" with a word value (20) of 611. The first 611 post decimal digits as at (77) of pi/π sum to the numerical value of 2701 as at (78), which numerical value 2701 (78) is exactly the verse value of biblical Genesis 1:1 describing the concept of creation. The resulting secondary or code2GOD meaning may translate into a message that the world was created based on the Torah (76) of the Bible, and that the pi/π code of Code No. 9 may help function as a cross-reference and/or confirmation of the primary meaning otherwise derived from the face value of the first verse and the Hebrew word, "תורה".

Figure 10:
FIG. 10 is a visual depiction of how initial letters of biblical names in Hebrew together form the Hebrew word for Israel.

An eleventh code or algorithm or Code No. 11 according to the present invention involves the use of acronyms to form word values (20) for the purpose of deriving secondary or code2GOD meaning from the Hebrew words from which initial Hebrew letters are lifted to form the acronym. In this regard, it is noted that an acronym is an abbreviation formed from the initial letters of other words and pronounced as a word. Referencing FIG. 10, the reader will there consider the first Hebrew letter of each of three fore fathers' and the four fore mothers' names make up the acronym name, "Israel" (98) or in Hebrew, "ישראל" (79). The three fore fathers' names are "Avraham" (80) or in Hebrew, "אברהם" (81); "Rivka" (82) or in Hebrew, "רבקה" (83), and "Yitzchak" (84) or in Hebrew, "יצחק" (85). The four fore mothers' names are "Leha" (86) or in Hebrew, "לאה" (87); "Rachel" (88) or in Hebrew, "רחל" (89); "Sara" (90) or in Hebrew, "שרה" (91); and "Yakov" (92) or in Hebrew, "יעקב" (93). A secondary or code2GOD meaning derived from the acronym name, "Israel" (98) or in Hebrew, "ישראל" (79) is that the for elders are inherently tied to the state or concept of Israel.

A twelfth code or algorithm or Code No. 12 according to the present invention involves the use of natural logarithm to derive secondary or code2GOD meaning from word values (20). The natural logarithm of a number is its logarithm to the base of the mathematical constant e, which is an irrational and transcendental number approximately equal to 2.718281828459. Code No. 12 is used to calculate the scientific correlation of spatial information such as distances (e.g. the distance from the Earth to the sun); temporal information such as periods of time; and other perceptive information including audible information (e.g. sounds), visual information (e.g. colors), frequency information, etc.

A thirteenth code or algorithm or Code No. 13 according to the present invention involves the use of simplified numerology. Given a word value (20), the single digits of the word value (20) may be summed to arrive a final reduced number between 1 and 9. If the finally reduced number is 11, 22, 33, or 44, these numbers will not be reduced any further for they are considered unique numbers. For example a word value (20) of 728 is firstly reduced to 17 by adding 7, 2, and 8 or 7+2+8=17, and then secondly reducing 17 or 1+7=8. The word value (20) of 911 finally reduces to 11 and not 2 since 11 is one of the four unique numbers.

Recalling the mystery, dominant, meaningful, or repetitive number 37 (e.g. body temperature is 37° C.), it will be seen the number firstly reduces to 10 (perfection) and secondly reduces to 1. A secondary or code2GOD meaning that may be derived from the number 37 is that the firstly reduced number 10 may mean, "perfection" and the secondly reduced number of 1 may mean, "new beginnings or the concept of divinity". A further example is illustrated by the simple numerology or finally reduced number that can be used to show that various words having the same finally reduced number have something in common. For example, the word, "lung" or in Hebrew, "ריאה" has a word value (20) of 180; the word, "nose" or in Hebrew, "אף" has a word value (20) of 81; the word, "nature" or in Hebrew "טבע" has a word value (20) of 81; the word, "face" or in Hebrew, "טבע" has a word value (20) of 180; and the word, "eyes" or in Hebrew, "ישראל" has a word value of 180. All of these word values (20) finally reduce to the number 9 and all the words have anatomical connotations in common.

A fourteenth code or algorithm or Code No. 14 according to the present invention involves interval skipping within a string of Hebrew letters. There are three factors to consider when finding a Hebrew word within a string of Hebrew letters as exemplified by the original Bible character string comprising 1,197,000 Hebrew letters. These three factors include (1) the starting or initial Hebrew letter in the string, (2) the number of Hebrew letters to skip over, and (3) directional movement within the string (i.e. forward or backward). The reader will here consider the Hebrew word, "מלאכים" or "malachim" or in English, "Angels" having a word value (20) of 141. This word can be derived from biblical Genesis 1:8 as at (94) starting with the initial letter number 663 and interval skipping in a backward direction a total of 6 letters until the Hebrew word, "מלאכים" is finally formed.

Note that the word value (20) of 141 finally reduced to simple numerology is 6 which is the number of interval skipped letters in this example. It is estimated that 0.1% of human DNA is unique to every human, which translates into roughly 32 million repetitions of the compounds Adenine (A), Cytosine (C), Guanine (G) and Thymine (T). The original Hebrew Bible string comprises 1,197,000 Hebrew letters of which there are 22 in the Hebrew alphabet or Alef-Beit. It is noted that locating genetic traits within human DNA is similar to finding meaningful words and events within the original Hebrew Biblical string and given the complexity of such sequences may be preferably performed by a computer.

A fifteenth code or algorithm or Code No. 15 according to the present invention follows from the observation that a set of Hebrew words can be correlated for deriving secondary or code2GOD meaning therefrom by way of applying mathematical operations to a given Hebrew word and its corresponding word value (20). For example, multiplications of the word, "lord" (21) or in Hebrew, "יהוה" or "yhvh" (22) having a word value (20) of 26 may yield word value (20) multiples of 26 and provide the chosen interpreter with information relating to the given word.

A further example is illustrated by the Hebrew word, "אברהם" (81) or "Avraham" (80) or in English, "Abraham" having a word value (20) of 248. The Hebrew word, "עדן" or in English, "eden" has a word value (20) of 124 and multiplied by 2 equates to 248 as in 124×2=248. Eden may thus correlate with Abraham via a multiplier of 2 and this information can be used to derive secondary or code2GOD meaning from the words illustrated. Further, the Hebrew names, "יצחק" or "Yitzchak" or in English, "Isaac"; "יעקב" or "Yakov" or in English, "Jacob"; and "יוסף" or "Yosef" or in English, "Josef" have corresponding word values (20) of 208=26×8; 182=26×7; and 156=26×6, respectively. The common multiplier of 26 is found in each word value (20) for these Hebrew names and this information can be used by the chosen interpreter to derive secondary or code2GOD meaning from the Hebrew names.

Recalling the original Bible's first verse sum of all 28 letters is 2701 as at (78), the reader will note that this number is the product of the dominant, meaningful, or repetitive number 37 multiplied by 73 as in 2701=37×73. The number 2701 (78) is also the sum of 37+999+888+777. The dominant, meaningful, or repetitive number 37 number 37 is also a factor of 999 (as in 999=37×27), of 888 (as in 888=37×24), and 777 (as in 777=37×21). A secondary or code2GOD meaning that can be derived from the numbers 2701 and 37. As previously described, 37 degrees Celsius is the average human body temperature and that of certain mammals including whales (with sea habitat), bats (with air habitat) and lions (with ground habitat). The number 37 is also the word value (20) of "Hevel" or "הבל" comprising the first letter (ב) and the last letter (ל) of the Torah (75) and the original Bible. The number 37 is also the word value (20) corresponding to the Hebrew, "הבל" (71) or "Hevel" (72) or in English, Abel representing the human spirit (73).

Figure 11A:
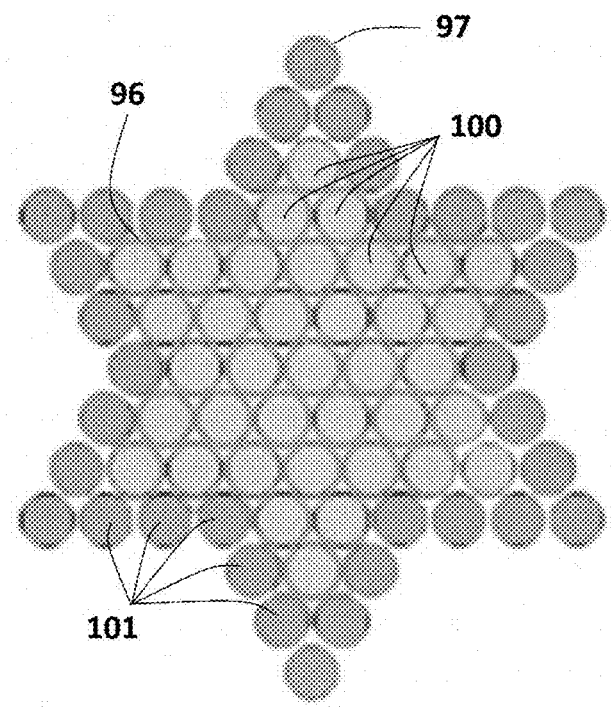
FIG. 11A is a first depiction of the Star of David shown comprising an inner and an outer hexagram, the inner hexagram comprising 37 dots and the outer hexagram comprising 36 dots.

A sixteenth code or algorithm or Code No. 16 according to the present invention involves the use of geometrical shapes from which to derive secondary or code2GOD meaning. The Star of David Theorem is a mathematical result on arithmetic properties of binomial coefficients. Comparatively referencing FIGS. 11A and 11B it will there be seen that the numbers 37 and 73 are inherently represented by the Star of David theorem. FIG. 11A comprises an inner hexagram as at (96) comprising 37 points (100) shown in first or relatively light grayscale coloration peripherally bound an outer hexagram as at (97) comprising 36 points (101) shown in second or relatively dark grayscale coloration together summing to a total of 73 points.

Figure 11B:
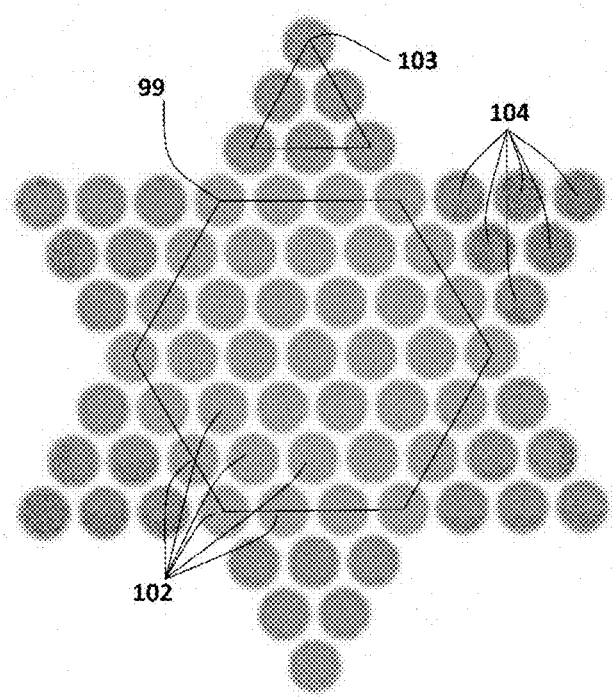
FIG. 11B is a second depiction of the Star of David shown comprising an inner hexagon and a series of six radiating triangles, the inner hexagon comprising 37 dots and the series of six radiating triangles comprising a total of 36 dots.
Figure 12:
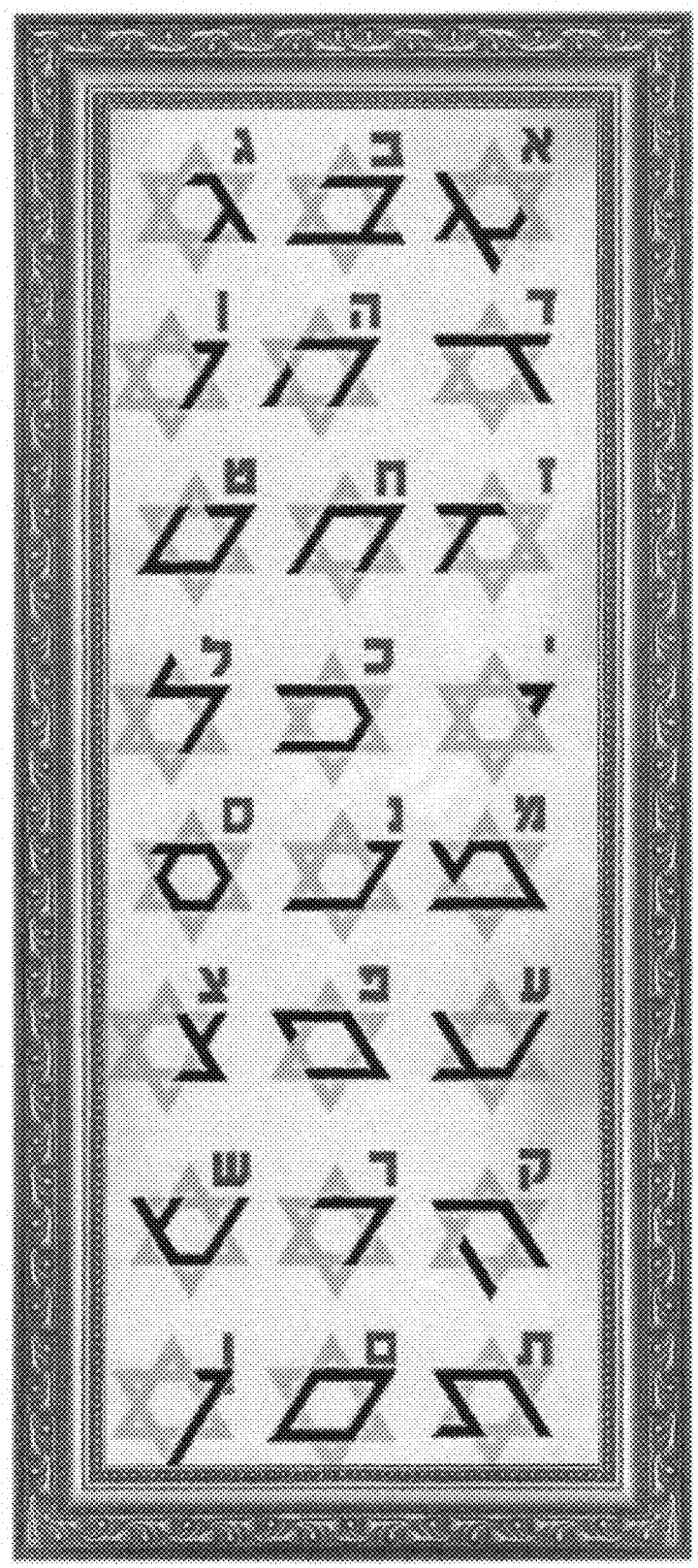
FIG. 12 is a visual depiction of the various Hebrew letters overlaid upon portions of the Star of David.

FIG. 11B by contrast comprises an inner hexagon (99) comprising 37 points (102) with 6 peripheral triangles (103) each of which comprise 6 points (104) summing to a total of 73 points. As previously described, the number 2701 (78) is the product of 37 and 73 as found within the original Hebrew bible string. The Star of David may also comprise a total of 541 points which equates with the word value (20) for the Hebrew, "ישראל" (79) or in English, "Israel" (98). Referencing FIG. 12C it will be seen that the Hebrew letter character forms of which there are 24=22+2 all correspond to portions of the Star of David. It will thus be seen that geometrical shape information can also be used to convey secondary or code2GOD meaning as derived from original Hebrew scripture.

A seventeenth code or algorithm or Code No. 17 according to the present invention involves counting the number of letters in a word, related words, or a sentence. For example, there are 13 Hebrew letters in the four names of the fore mothers: "Leha" (86) or in Hebrew, "לאה" (87); "Rachel" (88) or in Hebrew, "רחל" (89); "Sara" (90) or in Hebrew, "שרה" (91); and "Yakov" (92) or in Hebrew, "יעקב" (93). Further, there are 13 Hebrew letters in the three names of the fore fathers: "Avraham" (80) or in Hebrew, "אברהם" (81); "Rivka" (82) or in Hebrew, "רבקה" (83), and "Yitzchak" (84) or in Hebrew, "יצחק" (85). The number 13 is the word value (20) for the Hebrew word, "אהבה" or in English, "love". Adding the number 13 to 13 yields 26, which is the word value (20) for the Hebrew word, "יהוה" (22) or in English, "Lord" (21). These numerical results point to specific verse numbers between 1 and 23,204.

Similarly, the number of singular word repetitions in the original Hebrew Bible string can provide meaningful word values (20). Further, matching the first and last letters of a Hebrew word with the first and last letters of a verse from the original Hebrew bible string provides information for deriving additional secondary or code2GOD meaning. Further, matching name word value (20) with verse value or consecutive word value provides information for deriving additional secondary or code2GOD meaning. Further, using prime numbers to explain correlations between Hebrew words or verses provides information for deriving additional secondary or code2GOD meaning. Still further, using sequential Fibonacci numbers as reference for related Hebrew words provides information for deriving additional secondary or code2GOD meaning.

An eighteenth code or algorithm or Code No. 18 according to the present invention involves observation of various characteristics of each Hebrew letter to derive secondary or code2GOD meaning. In this regard, it is noted that each Hebrew letter or character form comprises a particular form, a name, and a name value. In this regard, the particular form of Hebrew letters can be analyzed for providing secondary or code2GOD meaning. The number of termination points of each Hebrew character; the directional position of termination points relative to the four primary directions (i.e. up, down, right, and left); the relative size of individual Hebrew letters compared to one another; and the relative position of individual Hebrew letters within the formal Hebrew alphabet or Alef-Beit provide information for deriving additional secondary or code2GOD meaning. Further, the vibration and fundamental frequency signatures that are inherent to spoken Hebrew letters can be visualized utilizing computer means, which can then be used to derive additional secondary or code2GOD meaning.

While the foregoing descriptions contain certain specificity, this specificity should not be construed as limitations on the scope of the invention, but rather as an exemplification of the invention. The foregoing specifications are contemplated to essentially provide a system and method, optionally implemented by at least one computer and a non-transitory software-based application implementable by at least one computer for deriving secondary or code2GOD meaning from a select letter string as exemplified by the original Hebrew biblical string consisting of 1,197,000 Hebrew letters devoid of spaces and punctuation. When considered methodologically, the method may be said to essentially comprise a series of steps. When considered systemically, the system according to the present invention may be said to essentially comprise at least one computer and a non-transitory computer-implementable application for implementing the essential methodology.

The method for deriving secondary or code2GOD meaning from a select letter string essentially comprises the step of firstly identifying a primary sequence of letters, each letter within the primary sequence of letters shown Column 10 are associated with a select numerical letter value as shown in Column 11 of FIG. 1. The letters within the primary sequence of letters as in Column 10 are arranged to form a select letter string as exemplified by the by the original Hebrew biblical string consisting of 1,197,000 Hebrew letters devoid of spaces and punctuation. The select letter string has a string value equal to the sum of the select numerical letter values for each of the letters within the select letter string.

The code2GOD method further comprises the step of identifying at least one first word within the select letter string. Referencing FIG. 1, it will there be seen that each of the letters listed in Column 10 comprise a name or word as shown in Column 12, and each name or word as set forth in Column 12 comprises an extended name or word value as in Column 13. Each word that is found within the original Hebrew biblical string consisting of 1,197,000 Hebrew letters devoid of spaces and punctuation comprises a select word value and a primary or face value meaning. The word values for each word found within the select letter string sum to the master string value, and respective words within the select letter string each have a substring value less than the master string value.

Word values of select words are correlated or loosely associated with other secondary or peripheral word values by way of the same or similar word values, and the primary meaning of firstly considered words can then be interpreted in the context of the secondary or peripheral word values for providing at least one secondary meaning of select words as compared to the primary or face value meaning(s) for bolstering an understanding of the primary meaning(s). For example, a full anagram of a first select word will always have the same word value of the first select word.

Accordingly, if the letters of the at least one first word are re-arranged to form at least one anagram word, the at least one anagram word comprises the select word value or at least one secondary sub word value if the first select word is re-arranged and broken into a series of anagram words derived from the first select word. The word values for the first select word and its anagram(s) may be interpreted to further bolster an understanding of the primary meaning of the first select word.

The code2GOD method according to the present invention may further comprise the step of coupling the first select word value to at least one second or additional word value to form a sequence or series of word values, which respectively can provide tertiary meaning or additional secondary or code2GOD meaning as interpreted within the context of multiple word values. The first word value and the at least one second or additional word values may be correlated or otherwise arithmetically operated by way of a select arithmetic operator as selected from the group consisting of addition, subtraction, division and multiplication functions. The select arithmetic operator essentially outputs an arithmetically-operated word value, which arithmetically-operated word value yields or provides at least one arithmetically-operated word meaning for providing additional secondary or code2GOD meaning.

The relative or absolute position of select letters within the primary sequence of letters can be selected to form either a relative position word value or an absolute position word value. In this regard, the reader will recall that the Hebrew word or "truth" comprises the first Hebrew letter in Column 10, the last Hebrew letter in Column 10, and the $14^{th}$ or middle Hebrew letter in Column 10. An interpretation of the positions of these letters is that truth is not definite and can be found within the entire spectrum or listing of values associated with the listed or primary sequence of Hebrew letters. Similarly, word values may be characterized by select traits as selected from the group consisting of a mystery word value, a dominant word value, a meaningful word value, and a repetitive word value. An example of this is the value 37 which value is consistent with a normalized body temperature in Celsius degrees. Additional secondary or code2GOD meaning can be derived from these select traits.

The code2GOD system/method according to the present invention may further focus upon a select string of words as selected from a select portion of an opening stanza of the select letter string. A first letter from each word of the select string of words are associated with a first letter value, and these first letter values may be totaled or summed and further operated by dividing the total number of letters for yielding a meaningful average numerical value, which meaningful average numerical value is substantially equal to 3.14 or $\pi$. This average numerical value being substantially equal to the 3.14 or $\pi$ can provide additional secondary or code2GOD meaning for the select string of words as selected from a select portion of an opening stanza of the select letter string as exemplified by the original Hebrew biblical string consisting of 1,197,000 Hebrew letters devoid of spaces and punctuation. Select word values may also be logarithmically operated to the base of Euler's number e for providing a natural logarithm for select word values for deriving additional secondary or code2GOD meaning.

The code2GOD system/method according to the present invention may further involve the summation of select numerical letter values of each letter in a select series of letters to provide a single reduced numerical value, the single reduced numerical value being either (a) between a range of values, the range of values being from 1 to 9; or (b) a select unique numerical value, the select unique numerical value being selected from the group consisting of 11, 22, 33, and 44. The single reduced numerical value can be used to derive additional secondary or code2GOD meaning for words having the same or related reduced numerical values as so reduced. It will be recalled that the reduced numerical value of 10 may represent perfection or may further reduce to a value of 1.

The code2GOD system/method according to the present invention may further focus upon a series of factors that are utilized to operate upon a select letter sub-string within the select letter string. These series of factors may comprise or consist of acronym-forming letters; select intervals of letters; and directional movement within the select letter string, the series of factors for providing additional secondary or code2GOD meaning (exemplified by DNA information). It is contemplated that a computer and a software-based application may well provide the most efficient means for deriving secondary or code2GOD meaning from portions of the original Hebrew Biblical string very much akin to the manner in which genetic traits within human DNA are located.

The code2GOD system/method according to the present invention may further focus upon the use of geometrical data to operate upon the select word value for providing additional secondary or code2GOD meaning. Geometrical data associated with the Star of David, for example, can be utilized to confirm the importance of the numerical value 37. In this regard, it will be recalled the Star of David Theorem is a mathematical result based on arithmetic properties of binomial coefficients. Comparatively referencing FIGS. 12A and 12B it will there be seen that the numbers 37 and 73 are inherently represented by the Star of David theorem, and can thus be harnessed to convey or derive secondary meaning from the original Hebrew biblical string or scripture.

The code2GOD system/method according to the present invention may further comprise the step of utilizing a select count to operate upon the select word value. The select count factor may be selected from the group consisting of a number of letters or letter number within a chosen letter string; a number of letters or letter number within related word strings; and a number of letters or letter number within a sentence. In this regard, it will be recalled the number of singular word repetitions in the original Hebrew Bible string can provide meaningful word values. Further, matching the first and last letters of a Hebrew word with the first and last letters of a verse from the original Hebrew bible string provides information for deriving additional secondary or code2GOD meaning. Further, using prime or Fibonacci numbers to explain correlations between Hebrew words or verses provides information for deriving additional secondary or code2GOD meaning.

The code2GOD system/method according to the present invention may focus upon the fact that each Hebrew letter within the primary sequence of Hebrew letters comprises a unique size and shape. The unique size and shape of each letter provides factor data, which factor data may be selected from the group consisting of letter termini data (i.e. number of end points); directional termini data (i.e. the number of end points in each of the four primary directions); and relative height-width data (the relative size of comparable Hebrew letters). The factor data can provide additional secondary or code2GOD meaning.

Accordingly, although the system and method according to the present invention have been described by reference to a number of different features and aspects, and optionally implementable by way of computer or machine-based means, it is not intended that the novel descriptions and systemic interactions thereof be limited thereby, but that modifications thereof are intended to be included as falling within the broad scope and spirit of the foregoing disclosure, the appended drawings, and the following claims.

What is claimed is:

1. A computer-implemented method for deriving divine messaging to humanity, the computer-implemented method comprising the steps of:
providing an original Hebrew bible letter string consisting of 1,197,000 Hebrew letters devoid of spaces and punctuation by a computer and a non-transitory software-based application implementable by the computer, each letter within the original Hebrew bible letter string being associated with a select numerical letter value;
selecting by the computer a select string of Hebrew words from a select portion of an opening stanza of the original Hebrew bible letter string, a first letter from each Hebrew word of the select string of Hebrew words having a first letter value;
summing the first letter values to yield a first letter value sum and dividing the first letter sum value by a total number of letters by the computer for yielding a meaningful average numerical value, the meaningful average numerical value being equal to 3.14;
identifying by the computer at least one first Hebrew word within the original Hebrew bible letter string, the at least one first Hebrew word having a primary meaning;
assigning by the computer the at least one first Hebrew word with a select word value;
correlating by the computer the select word value with at least one other secondary word value; and
interpretating the primary meaning of the at least one first Hebrew word in view of the at least one secondary word value, the at least one secondary word value and the meaningful average numerical value together providing at least one secondary meaning reflective of divine messaging to humanity, the at least one secondary meaning for bolstering an understanding of the primary meaning.

2. The computer-implemented method of claim 1 wherein the Hebrew letters of the at least one first Hebrew word are re-arranged by the computer to form at least one anagram word, the at least one anagram word comprising the select word value or at least one secondary sub word value, the select word value or the at least one secondary sub word value for further bolstering an understanding of the primary meaning.

3. The computer-implemented method of claim 1 comprising the step of coupling the first word value to at least one additional word value to form a word value sequence, the word value sequence for supporting a tertiary meaning.

4. The computer-implemented method of claim 3 wherein the first word value and the at least one second word value are correlated by way of a select arithmetic operator, the select arithmetic operator being selected from the group consisting of addition, subtraction, division and multiplication, the select arithmetic operator for outputting a combination word value, the combination word value for providing at least one arithmetically-operated word meaning.

5. The computer-implemented method of claim 1 wherein a relative position of select Hebrew letters within the primary sequence of Hebrew letters are selected to form a relative position word value.

6. The computer-implemented method of claim 1 wherein an absolute position of select Hebrew letters within the primary sequence of Hebrew letters are selected to form an absolute position word value.

7. The computer-implemented method of claim 1 wherein the word value is characterized by a select trait, the select trait being selected from the group consisting of a mystery word value, a dominant word value, a meaningful word value, and a repetitive word value, the select trait for deriving additional secondary meaning.

8. The computer-implemented method of claim 1 wherein the select word value is logarithmically operated to the base of Euler's number e by the computer for providing a natural logarithm for the select word value, the natural logarithm for deriving additional secondary meaning.

9. The computer-implemented method of claim 1 wherein the select numerical letter value of each Hebrew letter in a select series of Hebrew letters is summed by the computer to provide a single reduced numerical value, the single reduced numerical value being either (a) between a range of values, the range of values being from 1 to 9; (b) equal to 10; and (c) a select unique numerical value, the select unique numerical value being selected from the group consisting of 11, 22, 33, and 44.

10. The computer-implemented method of claim 1 wherein a series of factors are utilized by the computer to operate upon a select Hebrew letter sub-string within the original Hebrew bible letter string, the series of factors consisting of acronym-forming letters; select intervals of letters; and directional movement within the select letter string, the series of factors for providing additional secondary meaning.

11. The computer-implemented method of claim 1 wherein geometrical data is utilized by the computer to operate upon the select word value, the geometrical data for providing additional secondary meaning.

12. The computer-implemented method of claim 1 wherein a select count is utilized by the computer to operate upon the select word value, the select count being selected from the group consisting of a letter number within a chosen letter string; a letter number within related word strings; and a letter number within a sentence, the select count for providing additional secondary meaning.

13. The computer-implemented method of claim 1 wherein each Hebrew letter within the primary sequence of Hebrew letters comprises a unique size and shape, the unique size and shape of each letter providing factor data usable by the computer to yield additional secondary meaning, the factor data being selected from the group consisting of letter termini data, directional termini data, and relative height data, the factor data for providing additional secondary meaning.

14. A computer-implemented system for deriving divine messaging to humanity, the computer-implemented system comprising:
a computer-implementable software-based application; at least one computer; and a primary sequence of Hebrew letters, each Hebrew letter within the primary sequence of Hebrew letters being associated with a select numerical letter value, the Hebrew letters within the primary sequence of Hebrew letters being arranged by the computer via the computer-implementable software-based application to form the original Hebrew bible letter string devoid of spaces and punctuation and consisting of an arrangement of 1,197,000 Hebrew letters;
the computer-implementable software-based application and the at least one computer being operable to:
select a select string of Hebrew words from a select portion of an opening stanza of the original Hebrew bible letter string, a first letter from each Hebrew word of the select string of Hebrew words having a first letter value;
sum the first letter values to yield a first letter value sum and divide the first letter sum value by a total number of letters thereby yielding a meaningful average numerical value, the meaningful average numerical value being equal to 3.14;
identify at least one first Hebrew word within the original Hebrew bible letter string, the at least one first Hebrew word comprising a select word value and having a primary meaning;
correlate the select word value with at least one other secondary word value; and
interpretating the primary meaning of the at least one first Hebrew word in view of the at least one secondary word value, the at least one secondary word value and the meaningful average numerical value together providing at least one secondary meaning reflective of divine messaging to humanity, the at least one secondary meaning for bolstering an understanding of the primary meaning.

15. The computer-implemented system of claim 14 wherein the first word value and the at least one second word value are correlated by way of a select arithmetic operator via the computer, the select arithmetic operator being selected from the group consisting of addition, subtraction, division and multiplication, the select arithmetic operator for outputting a combination word value, the combination word value for providing at least one arithmetically-operated word meaning.

16. The computer-implemented system of claim 14 wherein the select numerical letter value of each Hebrew letter in a select series of Hebrew letters is summed by the computer to provide a single reduced numerical value, the single reduced numerical value being either (a) between a range of values, the range of values being from 1 to 9; (b) equal to 10; and (c) a select unique numerical value, the select unique numerical value being selected from the group consisting of 11, 22, 33, and 44.

17. The computer-implemented system of claim 14 wherein a series of factors are utilized by the computer to operate upon a select Hebrew letter sub-string within the original Hebrew bible letter string, the series of factors consisting of acronym-forming letters; select intervals of letters; and directional movement within the select letter string, the series of factors for providing additional secondary meaning.

18. The computer-implemented system of claim 14 wherein geometrical data is utilized by the computer to operate upon the select word value, the geometrical data for providing additional secondary meaning.

* * * * *